Sept. 23, 1924.  1,509,190

P. D. COOK

CHERRY PITTER

Filed March 12, 1923

INVENTOR.
Paul D. Cook
BY Milton S. Crandall
ATTORNEYS.

Patented Sept. 23, 1924.

1,509,190

UNITED STATES PATENT OFFICE.

PAUL D. COOK, OF SIOUX CITY, IOWA.

CHERRY PITTER.

Application filed March 12, 1923. Serial No. 624,451.

*To all whom it may concern:*

Be it known that I, PAUL D. COOK, a citizen of the United States, and a resident of Sioux City, in the county of Woodbury and State of Iowa, have invented certain new and useful Improvements in Cherry Pitters, of which the following is a specification.

My invention aims to provide an improved device for pitting cherries.

Another object of the invention is the production of a cherry pitter which is inexpensive in production yet simple and thoroughly efficient in operation and which removes the pits from the cherries rapidly and without unnecessarily mutilating or destroying the shape of the cherry.

With these and other objects and advantages in view the invention, consisting in the construction, combination and novel arrangements of parts, will be clearly understood from the following description, reference being had to the accompanying drawings which form a part of this application and in which like characters of reference indicate corresponding parts throughout the several views, of which,—

Figure 3:
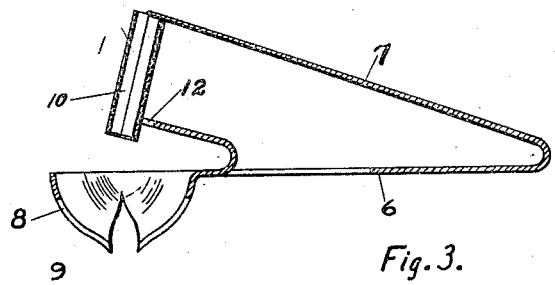
Fig. 3 is a central, vertical section thereof.
Figure 2:
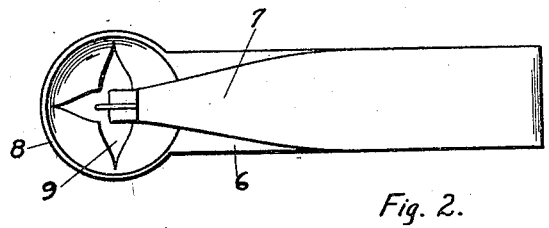
Fig. 2 is a plan thereof.
Figure 1:
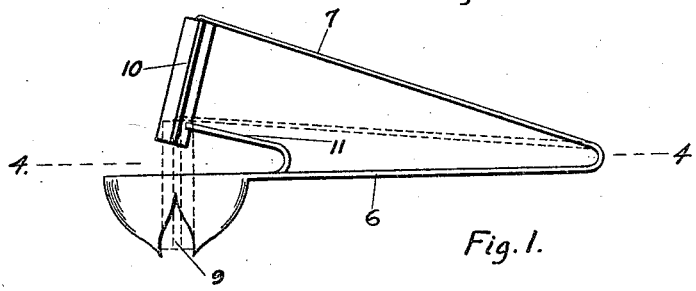
Fig. 1 is a side elevation of a cherry pitter constructed in accordance with my invention.
Figure 4:
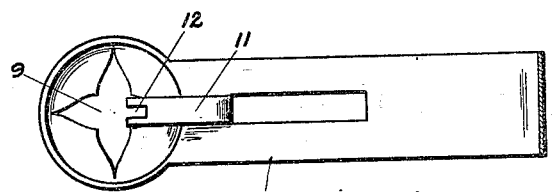
Fig. 4 is a horizontal section thereof taken on the line 4—4 of Fig. 1.
Figure 5:
Fig. 5 is an inverted plan of the upper arm of the device.

Referring to the illustrations, the device consists of a handle, preferably constructed of a strip of yieldable sheet metal and looped in a V-shape or otherwise looped to form a lower arm, 6, and an upper arm, 7, the free ends of which are relatively movable toward and from each other. The free end of the arm, 6, is formed with a cup, 8, to receive a cherry and having in its bottom part a star-shaped or other suitable opening, 9. The free end of the arm 7, is formed with a plunger of any suitable design, preferably consisting of intersecting plates, 10. In operation a cherry is placed in the cup and the arm, 7, sprung toward its mate, thus causing the plunger to penetrate the cherry and force the pit therefrom and through the opening, 9. As the cherry sometimes adheres to the plunger, I provide means on the lower arm, 6, for removing it which preferably consists of a short strip of metal, 11, secured on the arm, 6, and bent forward to extend in the direction of the plunger and bifurcated at its free end, as at 12, to receive the adjacent blade or flange of the plunger. The finger or strip, 11, and the plunger are so related that as the arm, 7, is retracted the finger, 11 acts to strip the cherry from the plunger.

While I have illustrated and herein described but one embodiment of the invention, I would not be understood as being limited to such specific construction, for various alterations and modifications may be made in the details of construction and arrangements of parts herein disclosed without departing from the spirit and scope of the invention as defined in the appended claims, to-wit:

1. A cherry pitter comprising a strip of flat spring metal bent in the form of a V so as to provide an upper and lower arm, a cherry cup formed on the lower arm, a plunger fixed to and depending from the upper arm, said plunger having on its side adjacent the arms, a longitudinal rib, a stripping finger formed of a slip of metal cut from the lower arm and bent back over the cherry cup, said finger having its end bifurcated to receive the rib of the plunger, and adapted to act as a guide for the plunger and to strip from the plunger, cherries impaled thereby.

2. A cherry pitter comprising a strip of flat spring metal bent in the form of a V so as to provide an upper and lower arm, a cherry cup formed on the lower arm, a plunger fixed to and depending from the upper arm, said plunger comprising a sheet of metal bent so as to have the form of a cross in transverse section, and thus having formed thereon a longitudinal rib adjacent the arms, a stripping finger formed of a slip of metal cut from the lower arm and bent back over the cherry cup, said finger having its end bifurcated to receive the rib of the plunger, and adapted to act as a guide for the plunger and to strip from the plunger, cherries impaled thereby.

In testimony whereof, I have hereunto set my hand this 7th day of March, 1923.

PAUL D. COOK.